April 12, 1938.                R. MAYER                    2,114,026
                          PASS AROUND LIGHTER
                          Filed Aug. 8, 1936              2 Sheets-Sheet 1
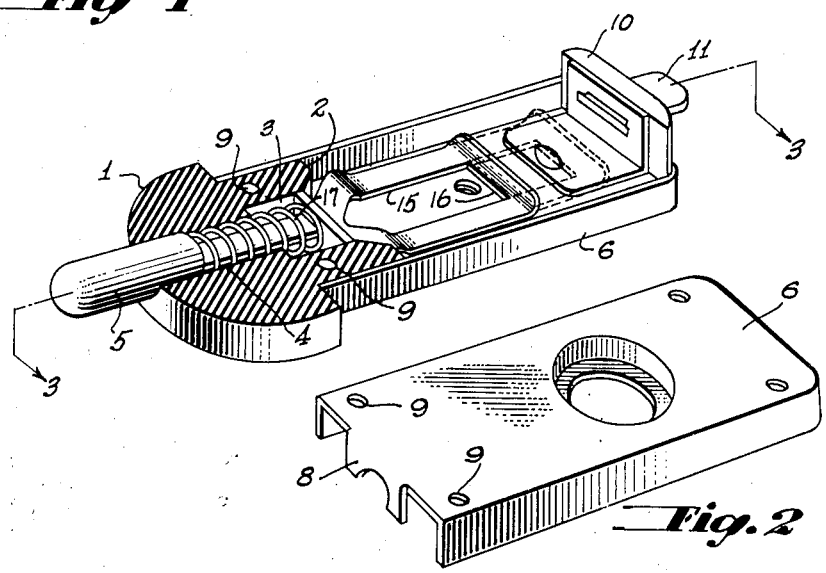
Fig. 1
Fig. 2
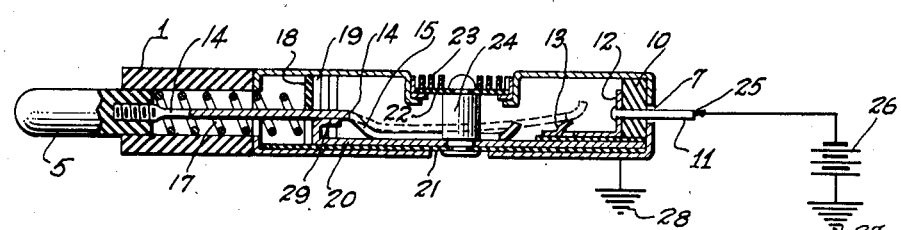
Fig. 3
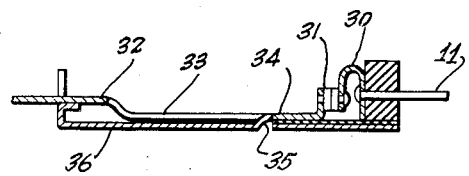
Fig. 4
INVENTOR.
Richard Mayer
BY
ATTORNEY.

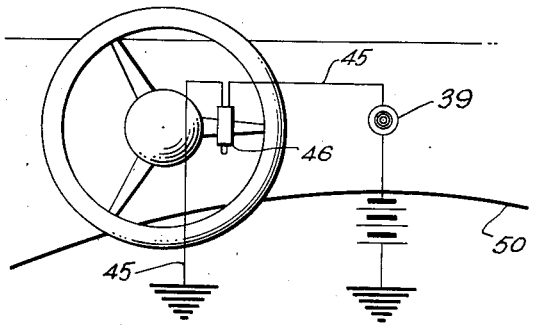
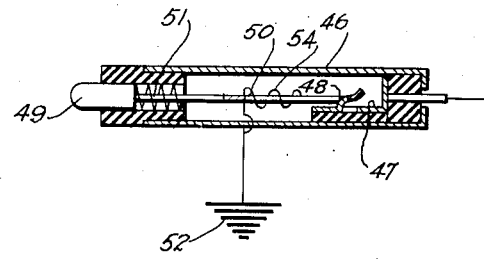
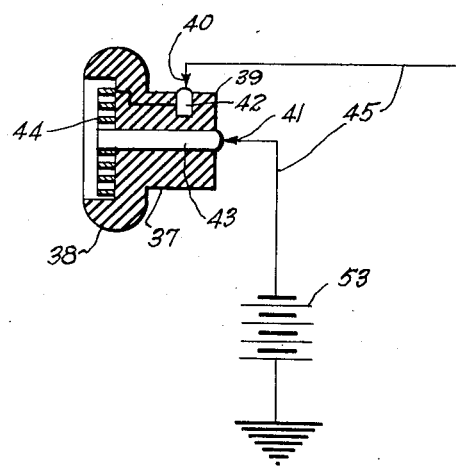

Patented Apr. 12, 1938

2,114,026

UNITED STATES PATENT OFFICE 2,114,026

PASS-AROUND LIGHTER

Richard Mayer, New Rochelle, N. Y.

Application August 8, 1936, Serial No. 94,900

5 Claims. (Cl. 219—32)

This invention relates to cigar and cigarette lighters and more particularly to that class of lighter which has come to be known as "pass-around" lighters. These lighters are frequently used as automobile accessories and, as such, are so associated with the instrument board of an automobile that, at the will of the operator, they may be energized from the battery of the car for the purpose of causing an ignition element to glow, after which they may be withdrawn from an associated socket and applied directly to the cigar or cigarette for the purpose of lighting the same. The peculiarity of such lighters resides in the fact that the ignition element is so constructed as to glow for a sufficiently long period to permit of lighting a cigarette or cigar without necessitating wiring connections to the pass-around portion or plug of the lighter.

Lighters of the character referred to have become quite popular and are well known. They are practically universally so constructed that the plug is received within a socket having electrical connections, so constituted that, under normal conditions, the ignition element of the lighter is de-energized. The parts are so constituted that, when it is desired to actuate the lighter, a knob on the plug is grasped and the plug bodily forced into the socket or rotated therein to establish an electrical circuit, the circuit being maintained so long as manual pressure is exerted on the knob, the circuit being broken when the manual pressure is released. This constitutes a serious hazard, particularly when the lighter forms a part of an automobile accessory, because it requires that the driver to operate the lighter take one hand off of the wheel and hold the lighter in energizing condition for an appreciable period or until the ignition element comes to a glowing state. This means that one hand of the operator is used for other purposes than for driving and the attention of the operator must also be given to the lighter, whereas his attention should be exclusively given to driving.

The primary object of the present invention is to eliminate these difficulties and to provide a simple and efficient lighter and one wherein initiation of the energizing operation may be accomplished by momentary pressure of the operator upon a current switching element for the purpose of completing the circuit. The structure is so constituted that the current switching element is locked in current closing condition and remains closed without further thought or effort on the part of the operator until the ignition element attains a glowing state, whereupon the current is automatically broken, preferably with a slight sound to advise the operator that the lighter is ready for the lighting of a cigarette or cigar.

An important feature of the present invention, in its preferred form, resides in the fact that continued pressure by the operator is not necessary. He merely initiates the energizing of the ignition element and proceeds with normal driving attention until the ignition element is in condition to light the cigarette. His mind is thus not detracted from the main business in hand and accidents are less apt to occur. Furthermore more efficient operation of the element will result and a proper glowing state will be assured, whereas, under present practice, there is a pronounced tendency either to remove the free portion of the lighter too soon or to leave the current on too long.

Features of the invention, other than those specified, will be apparent from the hereinafter detailed description and claims, when read in conjunction with the accompanying drawings.

The accompanying drawings illustrate different practical embodiments of the invention, but the constructions therein shown, are to be understood as illustrative, only, and not as defining the limits of the invention.

Figure 1 is a perspective view showing the plug of the lighter embodying this invention. In this figure, the knob by which the lighter is handled is shown in section and one cover is removed.

Figure 2 is a perspective view showing the cover removed in the showing of Figure 1.

Figure 3 is a section on the line 3—3 of Figure 1.

Figure 4 is a fragmental section showing a modified form of construction.

Figures 5 and 6 are diagrammatic views illustrating a modified form of the present invention.

The lighter of the present invention may be made of any appropriate cross section, either polygonal or round, but, for the purpose of illustration, it is shown as of rectangular cross section. In the accompanying drawings, I have merely shown the plug of the lighter. The socket may be of any appropriate form designed to properly cooperate with this plug.

Referring to the drawings, and more particularly to Figures 1–3, I designates the knob of the plug. It is of insulated material and of any appropriate shape to be readily grasped to withdraw the plug and pass it around. The knob I is provided with a reduced shank 2, the central portion of which is cut away as at 3 to provide a re-entrant opening and communicating with the base of this opening is a central channel 4 which passes entirely through the knob in an axial direction. A push button 5 operates in this channel in a manner presently to be described. The housing of the plug is formed in two parts and may conveniently be made of two stampings 6 substantially identical in form and preferably of sheet metal. These stampings are so arranged that they are complementary to one another, so that when placed with their open sides in abutting relation they will form a rectangular housing. One end of the housing is closed except for a relatively narrow slot 7, while the other end of the housing embraces the shank 2 and at the latter end of the housing each of the stampings is provided with an inturned tongue 8 which extends into the re-entrant portion 3 of the shank and assists in centralizing the housing sections with respect to the knob. Both housing sections, as well as the shank, are provided with perforations 9 and bolts or rivets are adapted to be passed through these perforations to secure the parts of the housing together and to the knob.

In the end of the housing remote from the knob is a block of insulation 10 which carries a contact tongue 11 extending through the slot 7 and free from contact with the housing sections, so that the tongue is insulated from the housing. Against the inner face of the block the tongue 11 is riveted over to clamp to the block 10 an angular metal contact 12 stamped up from which is a detent 13.

Secured to the inner end of the push button 5 is a current switching member 14 which is preferably in the form of a bimetal thermostatic latch. This latch 14, shown as a strip of varying width, extends longitudinally of the housing and has its central portion cut away, as shown at 15, to provide an abutment 16 near its forward end, which forward end is turned up. The current switching element 14 is biased in a downward direction, as viewed in Figures 1 and 3, so that, when the push button 5 is pressed, said element will ride with slight friction until it reaches the angular contact 12, whereupon the turned up end of the switching element will ride up over said contact and over the detent 13 until the opening 15 comes to the opening 15, whereupon the element will snap down over the detent and lock the push button against withdrawal. The push button normally tends to move outwardly under the tension of a spring 17, the inner end of which rests against an insulating plate 18, the lower half of which is forked to straddle the element 14 and this insulated plate 18 bears against the upturned forked end 19 of a metal plate 20, which rests on a sheet of insulating material 21, such as mica interposed between the plate 20 and the bottom wall of the housing so as to insulate the plate from the housing. The remote end of the plate 20 bears against the corresponding end of the housing with an interposed insulating part which may be formed by turning up the end of the mica sheet 21. The plate 20 further takes the thrust of the spring 17 in one direction, while the spring reacts against the push button 5 tending to normally project said button in an outer direction.

The upper half of the housing, as seen in Figures 2 and 3 is recessed to form a seat near an ignition element comprising a metal ring having an insulating base disk 22 on which is mounted a coil of resistance wire 23. The outer end of the coil is grounded with respect to the housing through the ring, while the inner end of the coil is electrically connected to a post 24 which extends through the opening 15 of the bimetal switching element and is secured to the plate 20 either by riveting over the end or bolting or screwing the post thereto.

The socket with which this plug is adapted to cooperate is provided with a suitable center contact diagrammatically illustrated at 25 and which contact is connected to a source of electrical energy 26, the other terminal of which is grounded at 27. The housing of the socket is grounded at 28. Consequently, when the push button 5 is pressed with the plug in the socket, a circuit will be completed from contact 25 through contact 11, angular contact 12, detent 13, to thermostatic element 14 in engagement with the detent, then to upturned end 19 of the plate 20, from this plate to post 24 to the inner end of coil 23, and through the coil to the housing which is grounded at 28. As a result, current will flow through the resistance coil 23 of the ignition and heat said coil to a glowing state. As the coil heats up, however, considerable heat will be radiated into the interior of the housing and this will affect the bimetallic thermostatic switching element, which is so constituted, that upon a rise in temperature, it will warp in an upward direction, as viewed in Figure 3. This element may be also heated somewhat by the passage of current therethrough for it is a current carrying member, and, if desired, it may be so constituted that it is mainly operated by heat due to resistance of current passing therethrough. In any event, the heating of said thermostatic element will cause it to warp upwardly until this movement becomes sufficient to free the abutment 16 from the detent 13, as indicated in dotted lines in Figure 3, whereupon the spring 17 will retract the push button and the switching element, thus breaking the circuit and, when the switching element cools off, it will return to the full line position of Figure 3.

In practice it is found that, when the switching element is released and is brought back sharply by the spring 17, there is an audible click which may be readily heard by the operator who is thus advised that the ignition element is in glowing condition and ready to be used. The operator may thereupon grasp the knob 1 and withdraw the plug to light his cigarette, returning the plug to the socket in inoperative condition, after this has been accomplished.

It will thus be seen that, in order to initiate operation of the lighter, it is only necessary to press the push button to engage the abutment of the switching element with the detent. The operator may then forget the lighter until he hears the click and if he thereupon withdraws the plug, he will find the lighter in efficient condition to perform its functions. He does not have to watch the lighter, while it is heating to see whether it is heated enough or whether it is overheating, but simply pushes the button and listens for the click and maximum efficiency will result.

An important feature of this construction is that the plug and ignition element remain stationary and in one position from the time that it is introduced into the socket until it is removed to light a cigarette. Only the push button is pushed momentarily. No movement of the plug proper is required. I have shown the upturned part 19 of the plate 20 as provided with a turned back tongue 29 bearing against the thermostatic switching element, so as to insure a good contact therewith.

In Figure 4, I have shown a modified form of construction. Here the plate 30, which corresponds to plate 12, is of resilient character and carries a contact adapted to cooperate with a contact 31, mounted on the upturned end of the current switching member 32 having an opening therein 33 which corresponds to the opening 15 and an abutment 34 which corresponds to the abutment 16. The detent 35 which corresponds to the detent 13 is formed on the plate 36 which corresponds to the plate 20. The operation of the structure is the same as in the preceding figures, except that when the push button is pressed and the current switching member 32 is moved forwardly, the abutment 34 engages with the detent 35 bringing the contact 31 in engagement with the contact on the resilient plate 30 and placing said plate under stress. This closes the circuit to the ignition element and it remains closed until the bimetallic thermostatic switching element warps upwardly out of engagement with the detent, whereupon the push button is retracted and the circuit broken. There are of course various ways in which this circuit might be established and broken, but the general principle consists in the manual movement of a thermostatic element to close a circuit and to lock it closed until the heat generated is sufficient to disengage it and permit of its automatic retraction. The thermostatic element should be so constituted as to act to break the circuit when the ignition element is at its maximum efficiency, i. e., sufficiently hot, but not overheated.

There may be cases in the use of a lighter of this kind, when the ignition element will cool off before all of the occupants of the car have completed the lighting of their cigarettes. In such cases, it is necessary to again incorporate the element in the energizing circuit in order to re-heat the same. However, it is found in practice that there is a tendency of the ignition element to cool faster than the bimetal thermostat, so that if the plug is returned to the socket, there may be times when this is accomplished before the thermostatic element is returned to its normally inactive position, wherein it is capable of engaging the detent when the push button is closed. The constructions shown, however, are such that the operator need not wait until the thermostatic element cools off, but can, in such cases, hold the push button 5 in pressed condition and to such degree that the free end of the bimetal element 14 will bear directly against the plate 12 in Figure 3 or against the contact on the plate 30 in Figure 4. By holding the push button in with these parts in contact, current may be made to flow immediately through the ignition element to commence immediate reheating thereof. Such a state of facts will not frequently occur, but even though they do infrequently happen adequate provision is made for such contingencies.

The foregoing detailed description sets forth preferred embodiments of the invention which are automatic in their nature. I am aware, however, that certain features of this invention may be employed without employing all and it is possible to utilize parts of the structure shown as a structure where, for example, the push button must be manually held in position to maintain the circuit until the ignition element is hot. This may be accomplished in either embodiment of the invention by simply omitting the detent 13 or the detent 35 and in such construction, the current switching member need not be a bimetallic thermostatic element, but merely a metallic strip. When these changes are made, the push button, after being initially pressed, must be held in pressed position in order to maintain the contact until the ignition element is heated, whereupon the plug may be withdrawn and used in the usual way. This latter structure has the advantage that it may be more simply operated than prior constructions, although it is open to the disadvantages that it requires the attention of the operator during the heating of the ignition element as is the case with practically all prior art constructions.

In the foregoing constructions embodying this invention the push button and the switch which it operates to control the ignition element have all been associated directly with the plug, but an alternate construction which may be employed is illustrated in Figures 5 and 6. In this showing, the plug 37 is shown as provided with a knob 38 having an extension 39 adapted to be received into a socket having two contacts 40 and 41. The plug has two cooperating contacts 42 and 43, respectively, and carries an ignition element 44, one terminal of which is secured to the contact 42, while the other is secured to the contact 43. There is no switch in the plug and when the plug is placed in its socket, the contacts 42 and 43 automatically come into engagement with the contacts 40 and 41. These contacts 40 and 41 are included in a circuit 45 which also includes a thermostatic switch 46 of any appropriate kind, shown for the purpose of illustration, as operating along the same general lines as the thermostatic switch of Figures 1–4. This thermostatic switch embodies a relatively fixed contact 47 provided with a detent 48 forming one terminal of the switch, while the push button 49 carries a bimetal movable contact 50 normally retracted by a spring 51. The bimetal movable contact is grounded at 52 to complete the circuit through the battery 53, the other terminal of which is grounded. When the push button 49 is pressed, the movable contact 50 engages with the detent 48 completing the circuit through the element 44, while the current through the bimetal contact 50 commences to heat up this contact, which by virtue of such rise in temperature, warps upwardly and disengages itself from the detent 48 allowing the spring 51 to return the push button to normal position and break the circuit. By this time, the ignition element has heated to a point where it is operable to light cigarettes in the usual way and the plug can thereupon be withdrawn from its socket and passed around to the various occupants of the car.

If desired, the bimetal thermostatic element 50 may be caused to heat up by virtue of its own resistance, or, if desired, it may be provided with an associated heating coil, indicated at 54 in Figure 6, to facilitate the heating of this element. Said heating coil is shown as connected in series with the ignition element 44 in this showing, although, if desired, it may be connected up in multiple.

I wish it understood that the plug in this form of the invention may be of any suitable character for the use intended and that the thermostatic current switching device may be likewise of any approved form to carry out the functions prescribed. Furthermore, the plug may be mounted in any appropriate position and the thermostatic switch may also be mounted in any appropriate position, the parts being connected together by suitable wiring as shown. For the purpose of illustration, I have shown in Figure 5, the plug 39 as mounted on the instrument board 53 of an automobile while the thermostatically controlled current switch device 46 is mounted on the wheel to be within convenient reach of the driver of the car and to permit of operation by him without taking his hand from the wheel and without even necessitating a glance at the switch. I consider this arrangement as a highly desirable one from the standpoint of safety.

The foregoing detailed description sets forth illustrative showings of the present invention, but the invention is to be understood as fully commensurate with the appended claims.

Having thus fully described the invention, what I claim as new and desire to secure by Letters Patent is:

1. A pass-around lighter plug comprising a knob of insulated material, a housing secured to the back of the knob, an ignition element on the housing, current switching means within the housing to complete an electric circuit to said element, and a push button operable through the knob to manually actuate the switching mechanism, said switching mechanism comprising a detent for locking said switching mechanism in circuit closing condition, and said switching mechanism also comprising a thermostatic member adapted to automatically release the thermostatic member from the detent when it becomes hot and a spring for retracting the thermostatic element and push button when released from the detent.

2. A pass-around lighter plug comprising a knob of insulating material, a metal housing rigidly secured to the knob and extending rearwardly therefrom, an ignition element supported on and at one side of the housing with one terminal of the element grounded on the housing, a fixed contact insulated from the housing and extending from the free end thereof, a slide within and insulated from the housing and electrically connected to the other terminal of the element, a spring for normally retracting said slide from contact with said fixed contact, and a push button secured to the slide and extending through the knob into accessible position at the outer end thereof and operable when compressed to force the slide into engagement with the fixed contact, whereby a circuit may be completed from the fixed contact to the housing of the plug through movement of the push button without attendant movement of the plug.

3. A pass-around lighter plug comprising a knob of insulating material, a metallic casing secured to the rear end of the knob and extending rearwardly therefrom to form, back of the knob, a closed housing rigid with the knob, a center fixed contact at the rear end of the housing insulated from the housing, an ignition element positioned at the side of the housing and supported thereby with one terminal of the element grounded on the housing, a push button operable through the knob, and current switching mechanism within the housing and operable by the push button to complete a circuit between the other terminal of the element and said fixed contact, all current carrying parts of said current switching mechanism being concealed within said housing and said current switching mechanism being operable by the push button while the knob remains stationary.

4. A pass-around lighter plug comprising a knob of insulating material, a metal housing rigidly secured to the knob and extending rearwardly therefrom, an ignition element supported on and at one side of the housing with one terminal of the element grounded on the housing, a fixed contact insulated from the housing and extending from the free end thereof, a slide within and insulated from the housing and electrically connected to the other terminal of the element, a spring for normally retracting said slide from contact with said fixed contact, and a push button secured to the slide and extending through the knob into accessible position at the outer end thereof and operable when compressed to force the slide into engagement with the fixed contact, whereby a circuit may be completed from the fixed contact to the housing of the plug through movement of the push button without attendant movement of the plug, said fixed contact including a detent adapted to engage with and hold the slide in circuit closing position when the latter is operated by the push button and said slide including thermostatic means within the housing to disengage the slide from said detent when the element becomes hot.

5. A pass-around lighter plug comprising an insulating handle knob, a conductive housing back of the knob adapted to extend into a socket, an ignition element on one side of said housing and one terminal of which is grounded on said housing, current switching mechanism within said conductive housing, and a manually operable finger piece operable through the knob and movable to actuate the switching mechanism without attendant movement of the knob or ignition element, and means within the housing for locking the current switching mechanism in circuit closing condition, said switching mechanism including a thermostatic element within the conductive housing to automatically break the circuit when it becomes hot, and a spring acting on the finger piece to snap the same into circuit opening position.

RICHARD MAYER.